US011053559B2

(12) United States Patent
Hagihara et al.

(10) Patent No.: US 11,053,559 B2
(45) Date of Patent: Jul. 6, 2021

(54) MELTING AND REFINING FURNACE FOR COLD IRON SOURCE AND METHOD OF OPERATING MELTING AND REFINING FURNACE

(71) Applicant: TAIYO NIPPON SANSO CORPORATION, Tokyo (JP)

(72) Inventors: Yoshiyuki Hagihara, Kofu (JP); Yasuyuki Yamamoto, Kofu (JP); Naoki Seino, Kai (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 337 days.

(21) Appl. No.: 16/083,993

(22) PCT Filed: Mar. 1, 2017

(86) PCT No.: PCT/JP2017/008092
§ 371 (c)(1),
(2) Date: Sep. 11, 2018

(87) PCT Pub. No.: WO2017/169486
PCT Pub. Date: Oct. 5, 2017

(65) Prior Publication Data
US 2019/0284652 A1    Sep. 19, 2019

(30) Foreign Application Priority Data
Mar. 31, 2016   (JP) .............................. JP2016-073420

(51) Int. Cl.
*C21B 13/12*   (2006.01)
*F27D 21/00*   (2006.01)
(Continued)

(52) U.S. Cl.
CPC .............. *C21B 13/12* (2013.01); *F23D 14/22* (2013.01); *F27D 21/00* (2013.01);
(Continued)

(58) Field of Classification Search
CPC .. F27B 3/085; F27B 3/205; F27B 3/28; F27B 3/225; F27B 3/18; F27B 3/22; F27B 3/19;
(Continued)

(56) References Cited

U.S. PATENT DOCUMENTS 3,129,930 A *  4/1964  Honore Labat-Camy ....................
                                                    F27B 3/205
                                                    432/13
4,749,408 A *  6/1988  Tate .......................... H05B 7/06
                                                    75/10.41
(Continued)

FOREIGN PATENT DOCUMENTS

CN        1071203     4/1993
CN        100416242   9/2008
(Continued)

OTHER PUBLICATIONS

International Search Report for PCT/JP2017/008092, dated May 23, 2017, 4 pages.
(Continued)

*Primary Examiner* — Gail Kaplan Verbitsky
(74) *Attorney, Agent, or Firm* — Nixon & Vanderhye P.C.

(57) ABSTRACT

One object of the present invention is to improve efficiency at the time of operation of a melting and refining furnace of a cold iron source using an oxygen burner lance, and the present invention provides a melting and refining furnace comprising a through-hole provided through a furnace wall, one or more oxygen burner lances provided in the through-hole: and a thermometer which is configured to measure a temperature in the furnace, the oxygen burner lance has one or more openings communicating with the inside of the furnace, and the thermometer is provided in any one of the openings.

7 Claims, 5 Drawing Sheets

(51) Int. Cl.
*F23D 14/22* (2006.01)
*C21C 5/52* (2006.01)
*F27D 19/00* (2006.01)
*G01J 5/00* (2006.01)

(52) U.S. Cl.
CPC ............ *F27D 21/0014* (2013.01); *C21C 5/52* (2013.01); *F27D 2019/0015* (2013.01); *G01J 5/004* (2013.01); *Y02P 10/20* (2015.11)

(58) Field of Classification Search
CPC ........ F27B 5/18; G01N 21/67; G01N 33/205; G01N 1/125; Y10S 266/90; Y10S 75/961; G01J 5/004; G01J 5/042; G01J 5/0044; G01J 5/0893; G01J 5/00; G01J 5/04; C03B 5/225; C03B 5/183; C03B 5/2353; C03B 19/109; C21C 5/5217; C21C 2005/5223
USPC .................................. 374/139, 121; 136/234
See application file for complete search history.

(56) References Cited

U.S. PATENT DOCUMENTS

| | | | | |
|---|---|---|---|---|
| 5,503,475 A * | 4/1996 | Yamaguchi | ........... | G01K 13/125 374/26 |
| 6,597,722 B2 * | 7/2003 | Mizukami | ............... | F27B 3/186 373/80 |
| 7,140,765 B2 | 11/2006 | Memoli et al. | | |
| 9,932,649 B2 * | 4/2018 | Lee | ........... | F27B 3/085 |
| 10,078,053 B2 * | 9/2018 | Ikeda | ..................... | G01N 21/68 |
| 10,612,104 B2 * | 4/2020 | Yoshida | ................. | C21C 5/5294 |
| 2002/0009118 A1 * | 1/2002 | Mizukami | ............... | F27B 3/085 373/80 |
| 2005/0145071 A1 | 7/2005 | Cates | | |
| 2010/0083884 A1 * | 4/2010 | Olin-Nunez | .............. | F23C 5/06 110/263 |
| 2010/0207306 A1 * | 8/2010 | Kendall | ................. | G01K 13/10 266/99 |
| 2011/0113926 A1 * | 5/2011 | Ichikawa | .................. | C22B 5/10 75/419 |
| 2011/0292961 A1 | 12/2011 | Matschullat et al. | | |
| 2012/0140787 A1 * | 6/2012 | Abel | ....................... | G01J 5/004 373/60 |
| 2014/0321504 A1 * | 10/2014 | Neyens | ................... | G01J 5/042 374/139 |
| 2016/0160303 A1 * | 6/2016 | Yoshida | ................ | C21C 5/5294 75/468 |
| 2017/0171919 A1 * | 6/2017 | Villemin | .................... | F27B 3/18 |
| 2020/0165692 A1 * | 5/2020 | Hagihara | ................ | F27B 3/225 |

FOREIGN PATENT DOCUMENTS

| | | |
|---|---|---|
| CN | 103562148 | 2/2014 |
| EP | 2380995 | 10/2011 |
| EP | 2 799 824 | 11/2014 |
| JP | 62-293128 | 12/1987 |
| JP | 05-263120 | 10/1993 |
| JP | 9-41017 | 2/1997 |
| JP | 11-217618 | 8/1999 |
| JP | 2000-337776 | 12/2000 |
| JP | 02001201270 A * | 7/2001 |
| JP | 3344863 B2 * | 11/2002 |
| JP | 2005-509881 | 4/2005 |
| JP | 4050195 | 2/2008 |
| JP | 2010-265485 | 11/2010 |
| JP | 2012-513007 | 6/2012 |
| JP | 2012-516938 | 7/2012 |
| TW | 201313908 | 4/2013 |
| WO | WO 03/044475 | 5/2003 |

OTHER PUBLICATIONS

Office Action for JP2016-073420, dated May 22, 2018, 9 pages.
Office Action issued in TW Appln. No. 106106986 dated Feb. 13, 2020 (w/ partial translation).
Office Action issue in CN Appln. No. 201780012463.1 dated Aug. 7, 2019 (w/ translation).
Notice of Allowance issued in JP Appln. No. 2016-073420 dated Oct. 2, 2018 (w/ translation).
Office Action issued in CN Appln. No. 201780012463.1 dated Mar. 27, 2019 (w/ translation).
Office Action issued in IN Appln. No. 201817034950 dated Jul. 4, 2020.

* cited by examiner

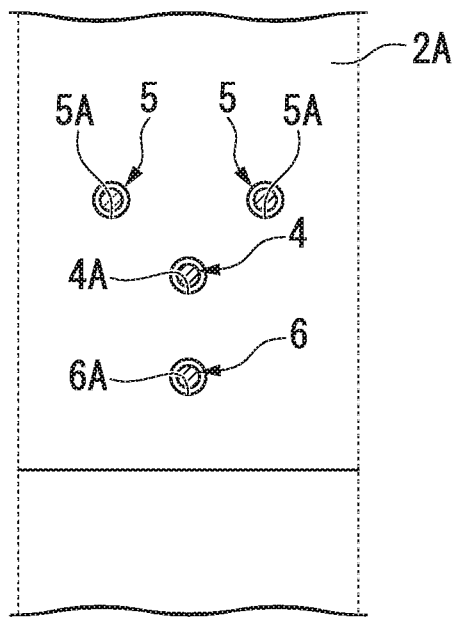

ically operated. The ejection amount of the combustion-supporting fluid is reduced to the cold iron source while reducing the consumption amount of the combustion-supporting fluid and the electric power consumption amount.

MELTING AND REFINING FURNACE FOR COLD IRON SOURCE AND METHOD OF OPERATING MELTING AND REFINING FURNACE

FIELD OF THE INVENTION

The present invention relates to a melting and refining furnace for a cold iron source and a method of operating a melting and refining furnace.

This application is the U.S. national phase of International Application No. PCT/JP2017/008092 filed Mar. 1, 2017, which designated the U.S. and claims priority to Japanese Patent Application No. 2016-073420, filed Mar. 31, 2016, the contents of each of which are incorporated herein by reference.

DESCRIPTION OF RELATED ART

A burner, which burns fuel and heats an object to be heated while ejecting a combustion-supporting fluid containing oxygen (for example, oxygen, air, oxygen-enriched air, etc.) has been used in various production processes. For example, in an electric furnace steelmaking process, when raw materials such as iron scraps are heated and melted in an electric furnace, a low temperature portion called a cold spot is generated in the raw material, and the raw material may be difficult to melt at the low temperature portion. Therefore, it is possible to increase the heating efficiency of the raw material, reduce an amount of electric power used for melting the raw material, and reduce the melting cost by using a burner.

It is also known that a part of the raw material is oxidized and melted by the combustion-supporting fluid to promote cutting the raw material and further improve the heating efficiency for the raw material. Furthermore, it is known that combustion of unburned fluid (such as carbon monoxide) can be promoted by supplying the combustion-supporting fluid.

In this way, there is a demand for reduction of the consumption amount of the combustion-supporting fluid, and suppression of peroxidation (yield improvement) of the raw material by optimizing the ejection amount of the combustion-supporting fluid depending on the melting state of the raw material cold iron source in the electric furnace and the generation amount of the unburned fluid in the operation of the electric furnace.

For example, Patent Document 1 discloses a smelting furnace utilizing oxygen gas which has been preheated to a high temperature in advance in order to increase heating efficiency during secondary combustion by the combustion-supporting fluid. In addition, Patent Document 2 discloses a melting and refining furnace which efficiently melts the cold iron source by using an oxygen burner lance.

PRIOR ART DOCUMENTS

Patent Literature

Patent Document 1: Japanese Unexamined Patent Application, First Publication No. 2000-337776
Patent Document 2: Japanese Patent No. 4050195

DISCLOSURE OF THE INVENTION

Problem to be Solved by the invention

However, in the method of operating the electric furnace disclosed in Patent Documents 1 and 2, it is desired to further improve the efficiency by improving the efficiency of the consumption amount of the combustion-supporting fluid and electric power consumption amount.

The present invention has been made in view of the above circumstances, and an object of the present invention is to improve the efficiency at the time of operation of a melting and refining furnace of a cold iron source using an oxygen burner lance.

In order to solve the problem, the present invention provides the following melting and refining furnaces.
(1) A melting and refining furnace comprising an oxygen burner lance which is configured to eject a combustion-supporting fluid containing oxygen and a fuel fluid toward a cold iron source in the furnace,
wherein the melting and refining furnace further comprises:
a through-hole provided through a furnace wall:
one or more oxygen burner lances provided in the through-hole; and
a thermometer which is configured to measure a temperature in the furnace,
the oxygen burner lance has one or more openings communicating with the inside of the furnace, and the thermometer is provided in any one of the openings.
(2) The melting and refining furnace according to (1), wherein one or more combustion-supporting fluid supply holes which are configured to supply a combustion-supporting fluid containing oxygen for secondary combustion into the furnace is provided through the furnace wall above the through-hole.
(3) The melting and refining furnace according to (1) or (2), wherein one or more carbon source supply holes which are configured to supply a carbon source into the furnace is provided through the furnace wall below the through-hole.
(4) The melting and refining furnace according to any one of (1) to (3), wherein the melting and refining furnace further comprises:
an exhaust gas discharge path which is configured to discharge an exhaust gas from the furnace; and
an exhaust gas analyzer which is configured to measure at least one of a concentration of components contained in the exhaust gas and a flow rate of the exhaust gas.
(5) The melting and refining furnace according to (4), wherein the melting and refining furnace further comprises:
a control device which is configured to receive a measured value of a furnace temperature from the thermometer and a measured value of a component concentration and a flow rate from the exhaust gas analyzer, analyze the measured values, and transmit a control signal for controlling a supply amount of the combustion-supporting fluid, the fuel fluid, and the carbon source which are supplied into the furnace.

In addition, in order to solve the problem, the present invention provides a method of operating a melting and refining furnace described below.
(6) A method of operating a melting and refining furnace in which a combustion-supporting fluid containing oxygen and a fuel fluid are ejected toward a cold iron source in the furnace by an oxygen burner lance, wherein the method comprises:
measuring a temperature in the furnace by a thermometer provided in the oxygen burner lance; and
controlling a supply amount of the combustion-supporting fluid and the fuel fluid to be supplied into the furnace based on a measured value of the temperature in the furnace.
(7) A method of operating a melting and refining furnace in which a combustion-supporting fluid containing oxygen and a fuel fluid are ejected toward a cold iron source in the furnace by an oxygen burner lance, wherein the method comprises:

measuring a temperature in the furnace by a thermometer provided in the oxygen burner lance;

measuring a concentration of a component contained in an exhaust gas discharged from the furnace and a flow rate of the exhaust gas; and controlling a supply amount of the combustion-supporting fluid, the fuel fluid, and a carbon source which are supplied into the furnace based on the temperature in the furnace, the concentration of the component, and the flow rate of the exhaust gas.

Effects of the Invention

The melting and refining furnace and the operating method thereof according to the present invention can improve the efficiency when operating a melting and refining furnace of a cold iron me using an oxygen burner lance.

BRIEF DESCRIPTION OF DRAWINGS

FIG. 7 is an enlarged planner view of a part of a furnace wall of a melting and refining furnace of another embodiment according to the present invention.

DETAILED DESCRIPTION OF THE INVENTION

Figure 1:
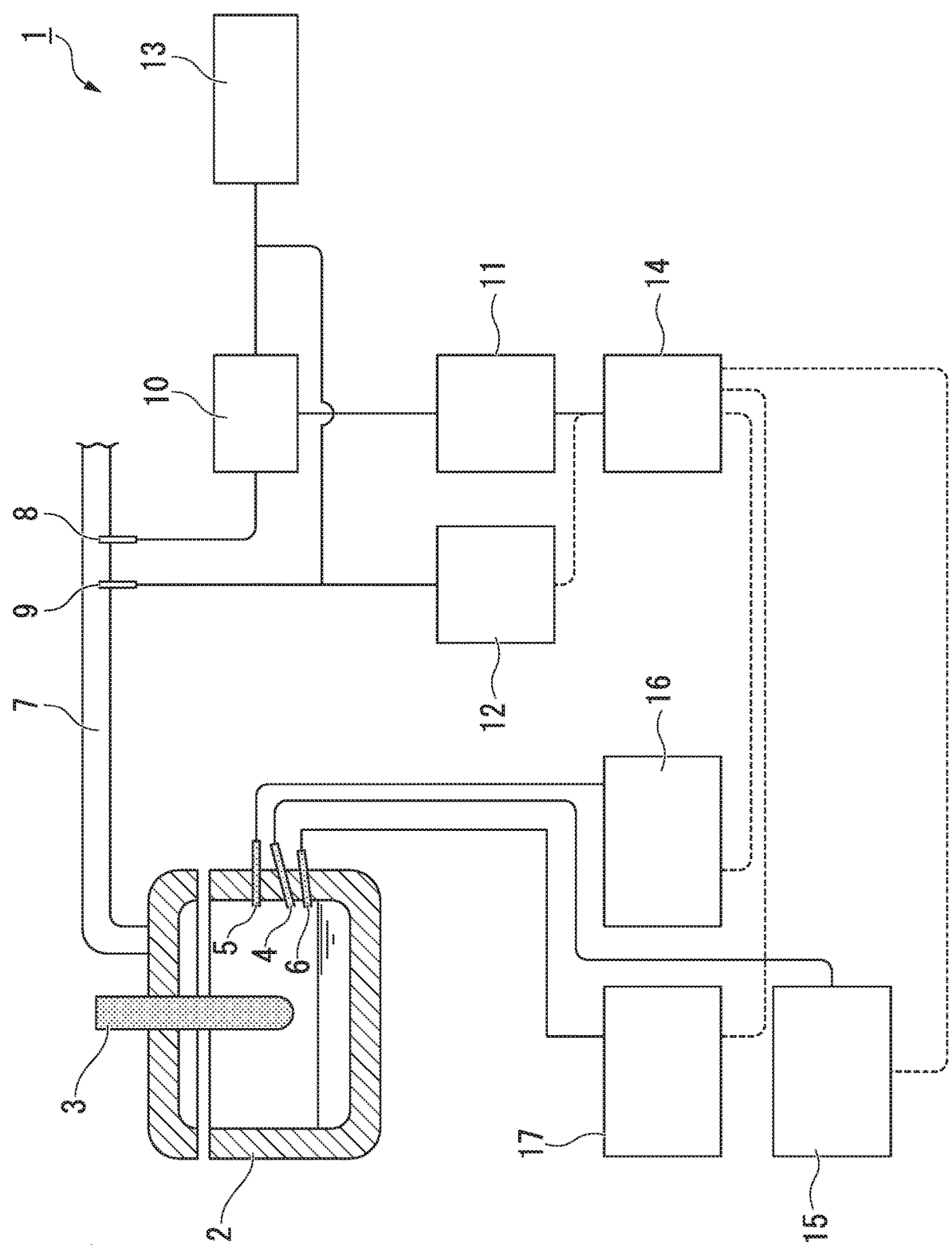
FIG. 1 is a system diagram showing an operation system including a melting and refining furnace of one embodiment according to the present invention.

Hereinafter, a melting and refining furnace of one embodiment according to the present invention will be described in detail with reference to the drawings as well as an operating method thereof. In the drawings used in the following description, for the sake of easy understanding of the features, there are cases where characteristic portions are shown enlarged for convenience, and the dimensional ratio of each component is not always the same as that of the actual melting and refining furnace.

First, a melting and refining furnace of one embodiment according to the present invention will be described.

FIG. 1 is a system diagram showing an operation system 1 including a melting and refining furnace 2 as one embodiment according to the present invention. As shown in FIG. 1, the operation system 1 includes a melting and refining furnace 2 of the present embodiment, an analysis unit (described later) of an exhaust gas discharged from the melting and refining furnace 2, a supply amount control unit for controlling various supply amounts into the melting and refining furnace 2 (described later), and a control device 14 electrically connected to the analysis unit and the supply amount control unit.

Figure 2:
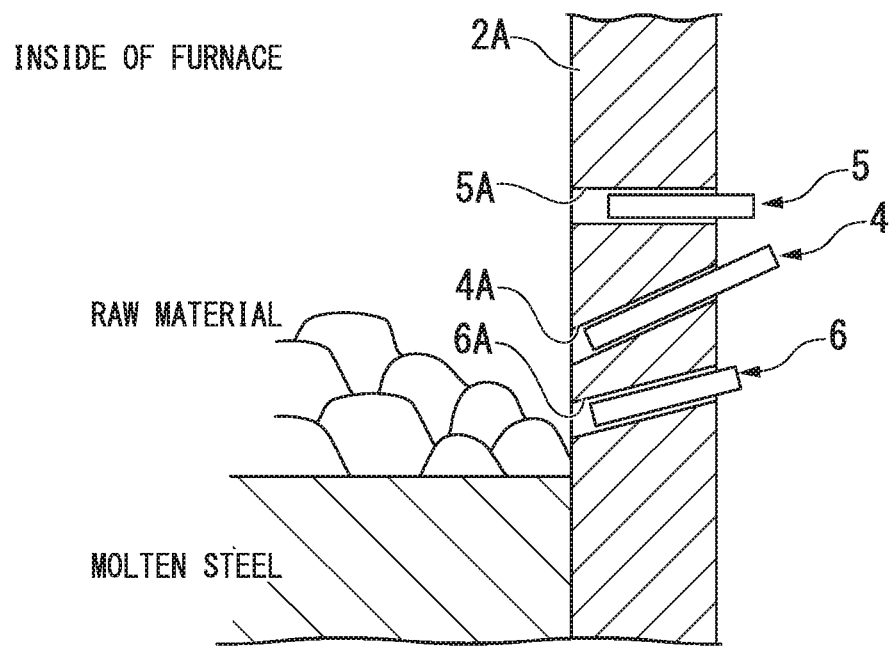
FIG. 2 is an enlarged sectional view of a vicinity of a furnace wall of a melting and refining furnace of one embodiment according to the present invention.
Figure 3:
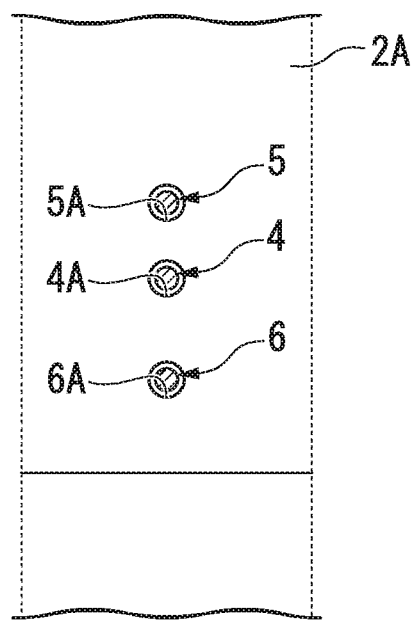
FIG. 3 is an enlarged planner view of a part of a furnace wall of a melting and refining furnace of one embodiment according to the present invention.

FIG. 2 is an enlarged sectional view of a vicinity of a furnace wall 2A of the melting and refining furnace 2 of the present embodiment. FIG. 3 is an enlarged planner view of a part of the furnace wall 2A of the melting and refining furnace 2 of the present embodiment.

As shown in FIGS. 1 to 3, the melting and refining furnace 2 of the present embodiment is an electric furnace which melts and refines a cold iron source with an electrode 3. A through-hole 4A, a combustion-supporting fluid supply hole 5A, and a carbon source supply hole 6A are provided in the melting and refining furnace (hereinafter also simply referred to as "electric furnace") 2 so as to penetrate the furnace wall 2A. An oxygen burner lance 4 is inserted into the through-hole 4A.

Figure 4:
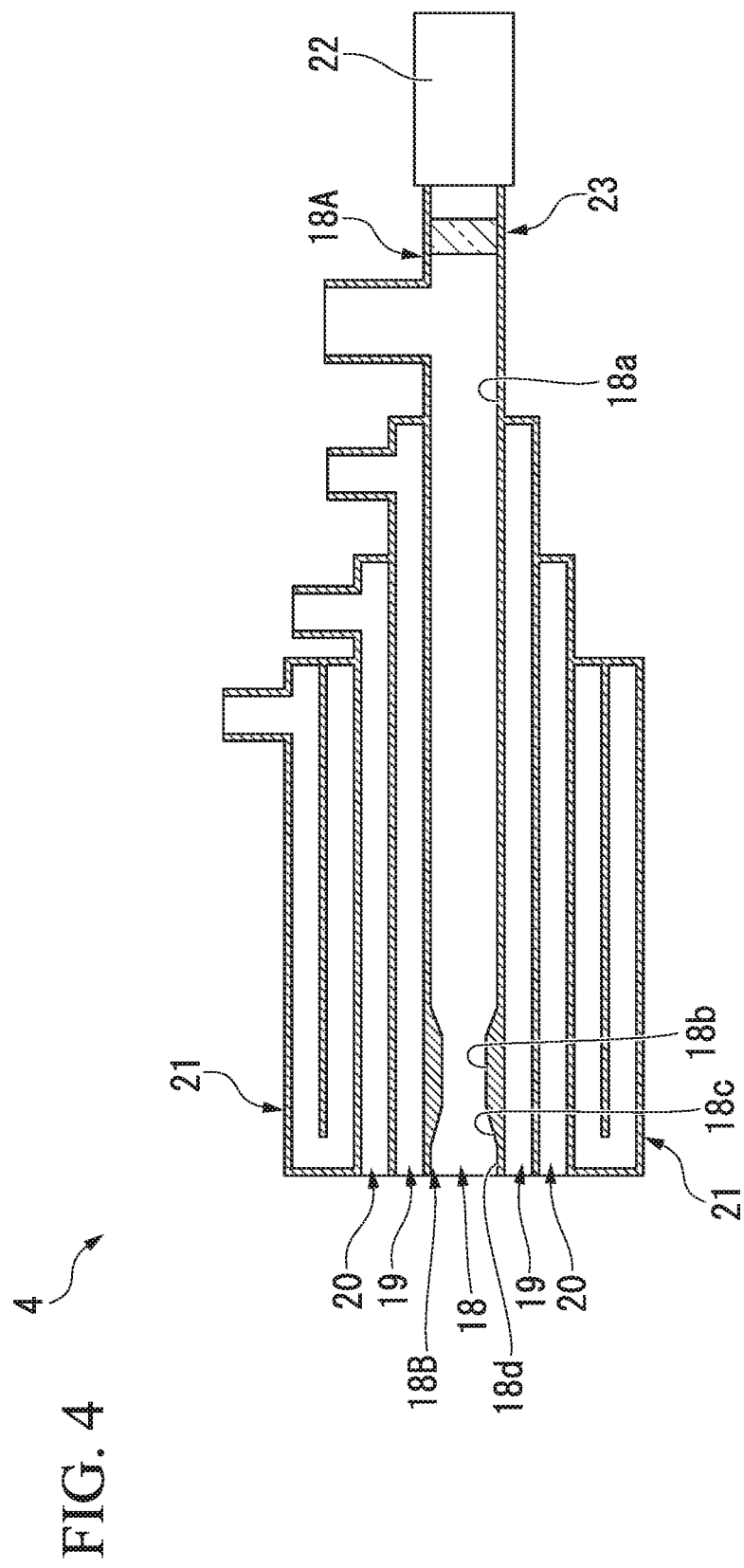
FIG. 4 is a schematic cross-sectional view showing an oxygen burner lance applicable to a melting and refining furnace of one embodiment according to the present invention.

FIG. 4 is a schematic cross-sectional view showing the oxygen burner lance 4 applicable to the melting and refining furnace 2 of the present embodiment. As shown in FIG. 4, a combustion-supporting fluid supply pipe 18 for supplying a combustion-supporting fluid containing oxygen is provided in the center of the oxygen burner lance 4, a fuel fluid supply pipe 19 for supplying a fuel fluid, and a combustion-supporting fluid supply pipe 20 are provided concentrically on the outer circumference of the combustion-supporting fluid supply pipe 18, and a reflux-type water cooling jacket 21 is further provided concentrically on the outer circumference of combustion-supporting fluid supply pipe 20 in the present embodiment.

The reflux type water cooling jacket 21 may be provided on the outer circumference of the fuel fluid supply pipe 19 without the combustion-supporting fluid supply pipe 20. When providing the combustion-supporting fluid supply pipe 20, it is possible to adjust the flame length by adjusting the oxygen flow rate ratio between the combustion-supporting fluid supply pipes 18 and 20.

The combustion-supporting fluid supply pipe 18 has a large-diameter portion 18a having a constant inner diameter, a throat portion 18b having an inner diameter smaller than that of the large-diameter portion 18a, a spreading portion 18c of which an inner diameter increases gradually from the throat portion 18b toward the distal side 18B, and a linear motion portion 18d having a substantially constant inner diameter from the proximal side 18A to the distal side 18B.

A radiation thermometer 22 is installed to proximal side 18A of the combustion-supporting fluid supply pipe 18 in order to grasp the temperature of the cold iron source in the electric furnace 2. Since the radiation thermometer 22 needs to measure the temperature at the time when the cold iron source melts down, it is desirable to install a radiation thermometer 22 capable of measuring a temperature in a range of about 600° C. to 2,000° C. As such a radiation thermometer, for example, "IR-SA" manufactured by CHINO CORPORATION may be exemplified.

In installing the radiation thermometer 22 in the combustion-supporting fluid supply pipe 18, in order to secure a measurement visual field while preventing the combustion-supporting gas supplied to the combustion-supporting-fluid supply pipe 18 from leaking, it is desirable to provide a partition 23 made of a pressure-resistant glass or the like on the proximal side 18A. In addition, since the environment where the oxygen burner lance 4 is installed tends to have a high temperature, it is preferable to protect the radiation thermometer 22 with an air-cooled or water-cooled jacket.

Further, as shown in FIG. 1, the oxygen burner lance 4 is connected to the oxygen burner lance control unit 15 for controlling the supply amount of the fuel fluid and the combustion-supporting fluid into the oxygen burner lance 4. In addition, the radiation thermometer 22 installed in the oxygen burner lance 4 is electrically connected to the oxygen burner lance control unit 15. Further, the oxygen burner lance control unit 15 is electrically connected to the control device 14. Therefore, the radiation thermometer 22 is electrically connected to the control device 14 via the oxygen burner lance control unit 15 and is capable of transmitting a record of the measurement value of the furnace temperature to the control device 14. On the other hand, the control device 14 can transmit a control signal to the oxygen burner lance control unit 15.

As shown in FIGS. 2 and 3, one or more combustion-supporting fluid supply holes 5A for supplying a combustion-supporting fluid containing oxygen for secondary combustion is provided in the furnace-wall 2A above the through-hole 4A into which the oxygen burner lance 4 is inserted. A lance 5 for supplying the combustion-supporting gas is inserted into the combustion-supporting fluid supply hole 5A.

Figure 5:
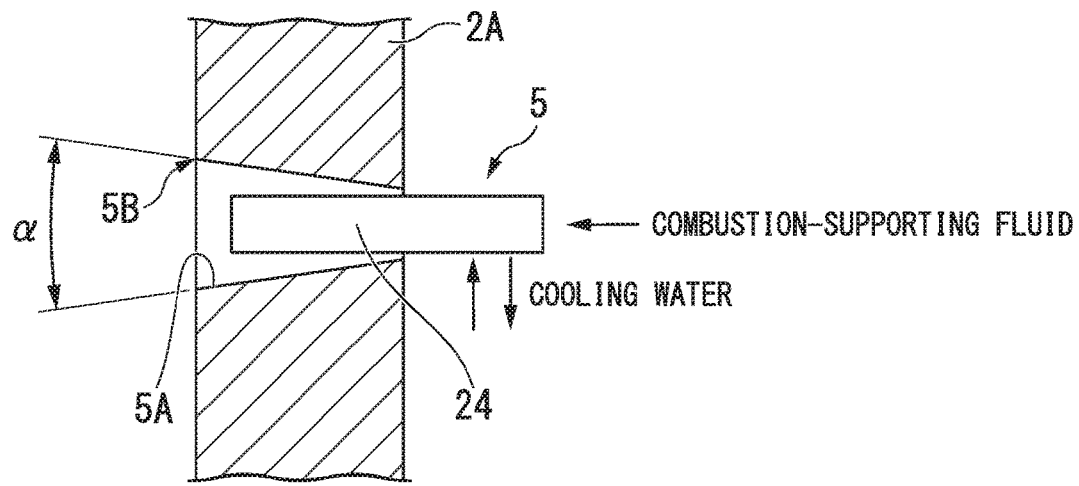
FIG. 5 is an enlarged sectional view of a vicinity of a furnace wall 2A provided with a combustion-supporting fluid supply hole 5A of a melting and refining furnace of one embodiment according to the present invention.
Figure 6:
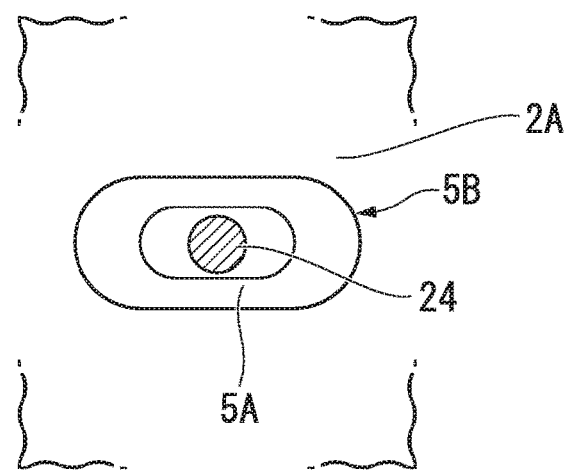
FIG. 6 is an enlarged planner view of a furnace wall 2A provided with a combustion-supporting fluid supply hole 5A of a melting and refining furnace of one embodiment according to the present invention.

FIG. 5 is an enlarged sectional view of a vicinity of the furnace wall 2A provided with the combustion-supporting fluid supply hole 5A of the melting and refining furnace according to the present embodiment. Further, FIG. 6 is an enlarged planner view of the furnace wall 2A provided with the combustion-supporting fluid supply hole 5A of the melting and refining furnace according to the present embodiment.

As shown in FIG. 5, it is preferable that the combustion-supporting fluid supply hole 5A be provided so as to increase in diameter at an angle α from the outer circumference side to the inner circumference side of the furnace wall 2A when the furnace wall 2A is viewed in cross section. As a result, the lance 5 can freely change the ejecting direction of the combustion-supporting fluid in the vertical direction. Further, as shown in FIG. 6, it is preferable that the combustion-supporting fluid supply hole 5A have a shape in which the clearance in the left-right direction is larger than the clearance in the vertical direction (for example, a racetrack shape) when the furnace wall 2A is viewed from the inside of the furnace in a planner view. As a result, the lance 5 can freely change the ejecting direction of the combustion-supporting fluid in the left-right direction.

In addition, the lance 5 includes a reflux water type cooling jacket 24 provided on the outer circumference of a combustion-supporting fluid supply pipe (not shown) for supplying the combustion-supporting fluid containing oxygen. Accordingly, as long as the furnace wall 2A of the electric furnace 2 has an appropriate opening (through-hole), it is possible to freely install the lance in any of refractory walls and water-cooled walls.

Since the ejecting direction of the lance 5 can also be freely changed, it is possible to adjust the ejecting direction in a direction in which the effect of secondary combustion can be maximized depending on the flow of the exhaust gas in the electric furnace 2.

Further, as shown in FIG. 1, the lance 5 is connected to a combustion-supporting fluid control unit 16 for controlling the supply amount of the combustion-supporting fluid to the lance 5. Further, the combustion-supporting fluid control unit 16 is electrically connected to the control device 14. On the other hand, the control device 14 can transmit a control signal to the combustion-supporting fluid control unit 16.

As shown in FIGS. 2 and 3, one or more carbon source supply holes 6A for ejecting (supply) a carbon source or the like into the electric furnace 2 is provided in the furnace wall 2A below the through-hole 4A into which the oxygen burner lance 4 is inserted. In addition, a carbon source supply lance 6 is inserted in the carbon source supply hole 6A. The carbon source carried by the carrier gas (nitrogen, air, oxygen-enriched air, oxygen, etc.) is supplied into the electric furnace 2 through the carbon source supply hole 6A. As a result, the carbon source ejected in and an excess oxygen contained in the molten steel react each other in the molten steel, CO gas is generated to foam the slag, and thereby creating a so-called slag forming state. As a result, since the slag brings the arc of the electric furnace 2 into the submerged state, it is possible to improve the energy efficiency of the arc.

Further, as shown in FIG. 1, the lance 6 is connected to a carbon source control unit 17 for controlling the supply amount of the carbon source into the lance 6. Further, the carbon source control unit 17 is electrically connected to the control device 14. On the other hand, the control device 14 can transmit a control signal to the carbon source control unit 17.

As shown in FIG. 1, the exhaust gas discharge path 7 for discharging the exhaust gas from the electric furnace 2 is provided with an exhaust gas analyzer 11 and an exhaust gas flow rate-measuring device 12. Since the exhaust gas generated from the electric furnace 2 contains a lot of dust, in order to analyze the exhaust gas, the pretreatment for the dust is important. Therefore, a filter unit 10 for removing dust in the exhaust gas and a sampling unit (not shown) for sucking the exhaust gas are provided on the primary side of the exhaust gas analyzer 11. Further, the exhaust gas analyzer 11 and the exhaust gas flow rate-measuring device 12 are electrically connected to the control device 14, and can transmit a record of the analysis results (component analysis result, flow rate value) to the control device 14.

The exhaust gas discharge path 7 is provided with a probe for exhaust gas sampling. More specifically, the probe includes an exhaust gas sampling pipe 8 for analyzing exhaust gas components such as CO, $CO_2$, $H_2$, $O_2$, $N_2$ and the like, and a pitot tube 9 for measuring the exhaust gas flow rate. While the electric furnace 2 is in operation, the exhaust gas sampling pipe 8 and the pitot tube 9 continuously suck the exhaust gas. Therefore, in order to prevent blockage due to the dust in the exhaust gas, the exhaust gas sampling pipe 8 and the pitot tube 9 are periodically purged by the purge unit 13.

Further, the probe is made of an alloy or ceramics with high heat resistance because it is subjected to the high-temperature exhaust gas. In consideration of wear due to high temperature oxidation, damage due to thermal shock, etc., it is preferable that the probe have a reflux type water cooling jacket.

As described above, in the operation system 1 of the present embodiment the analysis unit is constituted by the exhaust gas sampling pipe 8, the pitot tube 9, the filter unit 10, the exhaust gas analyzer 11, the exhaust gas flow rate-measuring device 12, and the purge unit 13. In addition, in the operation system 1 of the present embodiment, the supply amount control unit is constituted by the oxygen burner lance control unit 15, the combustion-supporting fluid control unit 16, and the carbon source control unit 17.

Next, an example of the operation method of the melting and refining furnace (electric furnace) 2 of the press embodiment (that is, the operation method of the operation system 1) will be described.

Specifically, first, when the cold iron source as a raw material is put into the electric furnace 2, the temperature in the furnace is measured indirectly by the radiation thermometer 22 which is provided on the proximal side 18A of the combustion-supporting fluid supply pipe 18 of the oxygen burner lance 4 through the furnace wall 2A of the electric furnace 2. Immediately after the start of the operation, since it is determined that the furnace temperature is "low", the signal is transmitted to the oxygen burner lance control unit 15, and the operation (combustion) of the oxygen burner lance 4 is started.

At the same time, the exhaust gas analyzer 11 measures the flow rate of the exhaust gas generated in the electric furnace 2 and the concentration of the unburned fluid contained in the exhaust gas. Then, the combustion-supporting gas such as oxygen necessary for burning the unburned fluid is supplied into the electric furnace 2 through the combustion-supporting fluid supply hole 5A to burn the unburned fluid. As a result, combustion heat is generated, and the cold iron source is heated. Moreover, by controlling the flow rate of the combustion-supporting gas depending on the amount of unburned fluid generated, it is possible to eject the combustion-supporting gas into the furnace without excess or deficiency.

Next, when the cold iron source input is melted, since it is determined that the furnace temperature is "high" by the radiation thermometer 22. The signal is transmitted to the oxygen burner lance control unit 15, and the operation (combustion) of the oxygen burner lance 4 is stopped.

At this time, in order to remove the carbon in the molten steel, it is possible to eject oxygen into the molten steel from the oxygen burner lance 4, and decompose the carbon. At the same time, an operation signal can be transmitted to the carbon source control unit 17, and a carbon source can be supplied from the carbon source supply hole 6A into the furnace to create a slag-forming state.

As described above, according to the melting and refining furnace (electric furnace) 2 of the present embodiment and the operation method thereof, when operating the melting and refining furnace of the cold iron source using the oxygen burner lance 4, the efficiency can be improved.

Further, according to the melting and refining furnace (electric furnace) 2 of the present embodiment, the combustion-supporting fluid containing oxygen and the fuel fluid are ejected directly toward the cold iron source in the furnace to melt and refine the cold iron source by using the oxygen burner lance 4. Since the oxygen burner lance 4 has an opening communicating with the inside of the furnace in order to provide a thermometer capable of indirectly measuring the temperature in the furnace, it is possible to confirm a heating and melting state of the cold iron source in the furnace through the opening.

Further, according to the melting and refining furnace (electric furnace) 2 of the present embodiment, the combustion-supporting fluid supply hole 5A for supplying the combustion-supporting fluid containing oxygen for secondary combustion is provided in the furnace wall 2A above the through-hole 4A, it is possible to eject oxygen through the combustion-supporting fluid supply hole 5A, burn unburned fluid ($CO$, $H_2$, etc.) generated at the time of heating and melting of the cold iron source, and heat the cold iron source by the heat generated by burning unburned fluid.

According to the melting and relining furnace (electric furnace) 2 of the present embodiment, the carbon source supply hole 6A for ejecting the carbon source into the furnace is provided in the furnace wall 2A below the through-hole 4A, and the carbon source supply hole 6A can be used as a carbon source charging port in the refining period. Accordingly, it is possible to keep the furnace in a hermetically sealed state in the melting and refining step, so that the cold iron source can be heated and melted efficiently.

Further, according to the operation system 1 including the melting and refining furnace (electric furnace) 2 of the present embodiment, the exhaust gas discharge path 7 of the electric furnace 2 provided with the oxygen burner lance 4 is provided with the exhaust gas analyzer 11 for measuring the concentration of $CO$, $CO_2$, $H_2$, $O_2$, and $N_2$, and the exhaust gas flow rate-measuring device 12 for measuring the gas flow rate, so that it is possible to grasp the concentration and the flow rate of the unburned combustion fluid.

Further, it is possible to appropriately control the flow rate of the combustion-supporting fluid ejected into the furnace from the combustion-supporting fluid supply hole 5A and the supply amount of the carbon source into the furnace while observing the heating and melting state of the cold iron source in the furnace based on the temperature in the furnace measured by the thermometer 22.

In addition, it is possible to appropriately control the flow rate of the combustion-supporting fluid ejected into the furnace from the oxygen burner lance 4 and the combustion-supporting fluid supply hole 5A, and the supply amount of the carbon source into the furnace according to the generation state (amount and concentration) of unburned fluid in the furnace based on the measurement value of the exhaust gas analyzer 11.

It should be noted that the technical scope of the present invention is not limited to the above embodiments, and various modifications can be made without departing from the spirit of the present invention.

For example, in the melting and smelting furnace 2 of the embodiment described above, one combustion-supporting fluid supply hole 5A is provided above the through-hole 4A into which the oxygen burner lance 4 is inserted, but the present invention is not limited thereto. For example, as shown in FIG. 7, two combustion-supporting fluid supply holes 5A may be provided above the through-hole 4A into which the oxygen burner lance 4 is inserted.

Furthermore, in the melting and refining furnace 2 of the embodiment described above, the radiation thermometer 22 is used as a thermometer for measuring the temperature inside the furnace. However, as long as it can indirectly measure the temperature inside the furnace, any temperature-measuring device can be used. Specifically, for example, infrared thermography (thermo viewer), a two-color thermometer or the like may be used.

In addition, in the melting and refining furnace 2 of the embodiment described above, the radiation thermometer 22 is installed in the combustion-supporting fluid supply pipe 18 located in the center of the oxygen burner lance 4. However, the present invention is not limited to this position as long as the measurement field of view can be secured without providing a new through-hole in the furnace wall 2A. Specifically, for example, the radiation thermometer 22 may be installed in a part of the fuel fluid supply pipe 19 and the combustion-supporting fluid supply pipe 20.

INDUSTRIAL APPLICABILITY

According to the melting and refining furnace and the operating method of the melting and refining furnace according to the present invention, when operating or refining a melting and refining furnace of a cold iron source using an oxygen burner lance, the efficiency can be improved.

EXPLANATION OF REFERENCE NUMERAL 1 operating system
2 melting and refining furnace (electric furnace
2A furnace wall
3 electrode
4 oxygen burner lance
4A through-hole
5, 6 lance
5A combustion-supporting fluid supply hole
6A carbon source supply hole
7 exhaust gas discharge path
8 exhaust gas sampling pipe
9 pitot tube
10 filter unit
11 exhaust gas analyzer
12 exhaust gas flow rate-measuring device
13 purge unit
14 control device
15 oxygen burner lance control unit
16 combustion-supporting fluid control unit
17 carbon source control unit

The invention claimed is:

1. A melting and refining furnace comprising an oxygen burner lance which is configured to eject a combustion-supporting fluid containing oxygen and a fuel fluid toward a cold iron source in the furnace,
wherein the melting and refining furnace further comprises:
a through-hole provided through a furnace wall;
one or more oxygen burner lances provided in the through-hole; and
a thermometer which is configured to measure a temperature in the furnace,
the oxygen burner lance has one or more openings communicating with the inside of the furnace, and the thermometer is provided in any one of the openings,
wherein one or more combustion-supporting fluid supply holes which are configured to supply a combustion-supporting fluid containing oxygen for secondary combustion into the furnace is provided through the furnace wall above the through-hole, and
wherein one or more carbon source supply holes which are configured to supply a carbon source into the furnace is provided through the furnace wall below the through-hole.

2. The melting and refining furnace according to claim 1, wherein the melting and refining furnace further comprises:
an exhaust gas discharge path which is configured to discharge an exhaust gas from the furnace; and
an exhaust gas analyzer which is configured to measure at least one of a concentration of components contained in the exhaust gas and a flow rate of the exhaust gas.

3. The melting and refining furnace according to claim 2, wherein the melting and refining furnace further comprises:
a control device which is configured to receive a measured value of a furnace temperature from the thermometer and the measured value of the at least one of a component concentration and a flow rate from the exhaust gas analyzer, analyze the measured values, and transmit a control signal for controlling a supply amount of the combustion-supporting fluid, the fuel fluid, and the carbon source which are supplied into the furnace.

4. A method of operating a melting and refining furnace according to claim 1, wherein the method comprises:
measuring a temperature in the furnace by a thermometer provided in the oxygen burner lance; and
controlling a supply amount of the combustion-supporting fluid and the fuel fluid to be supplied into the furnace based on a measured value of the temperature in the furnace.

5. A method of operating a melting and refining furnace according to claim 1, wherein the method comprises:
measuring a temperature in the furnace by a thermometer provided in the oxygen burner lance;
measuring a concentration of a component contained in an exhaust gas discharged from the furnace and a flow rate of the exhaust gas; and
controlling a supply amount of the combustion-supporting fluid, the fuel fluid, and a carbon source which are supplied into the furnace based on the temperature in the furnace, the concentration of the component, and the flow rate of the exhaust gas.

6. The melting and refining furnace according to claim 1, wherein the melting and refining furnace further comprises:
an exhaust gas discharge path which is configured to discharge an exhaust gas from the furnace; and
an exhaust gas analyzer which is configured to measure at least one of a concentration of components contained in the exhaust gas and a flow rate of the exhaust gas.

7. The melting and refining furnace according to claim 1, wherein the melting and refining furnace further comprises:
an exhaust gas discharge path which is configured to discharge an exhaust gas from the furnace; and
an exhaust gas analyzer which is configured to measure at least one of a concentration of components contained in the exhaust gas and a flow rate of the exhaust gas.

* * * * *